US007949760B2

(12) United States Patent
Chitilian et al.

(10) Patent No.: US 7,949,760 B2
(45) Date of Patent: *May 24, 2011

(54) SYSTEM AND METHOD FOR SERVING AN APPLICATION TO A HETEROGENEOUS COLLECTION OF CLIENT DEVICES

(75) Inventors: Varouj Armen Chitilian, San Francisco, CA (US); Joseph Michael Rozier, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1159 days.

This patent is subject to a terminal disclaimer.

(21) Appl. No.: 11/057,429

(22) Filed: Feb. 14, 2005

(65) Prior Publication Data

US 2006/0075115 A1 Apr. 6, 2006

Related U.S. Application Data

(60) Provisional application No. 60/609,052, filed on Sep. 11, 2004.

(51) Int. Cl.
*G06F 15/16* (2006.01)
*G01R 31/08* (2006.01)
(52) U.S. Cl. ............... 709/227; 709/232; 370/230
(58) Field of Classification Search ............ 709/227, 709/232; 370/230
See application file for complete search history.

(56) References Cited

U.S. PATENT DOCUMENTS

| 7,299,277 B1* | 11/2007 | Moran et al. ............ 709/224 |
| 2001/0032317 A1* | 10/2001 | Crockett ............ 713/190 |
| 2002/0069282 A1* | 6/2002 | Reisman ............ 709/227 |
| 2002/0156901 A1* | 10/2002 | Erickson et al. ............ 709/227 |
| 2005/0033847 A1* | 2/2005 | Roy ............ 709/227 |
| 2005/0198285 A1* | 9/2005 | Petit ............ 709/225 |

OTHER PUBLICATIONS

Lynx text browser for the World Wide Web, available at http://www.lynx.browser.org, 6 pages printed Feb. 17, 2005 from http://lynx.iso.org/release/features.html.
Charva Abstract Windowing Toolkit (AWT), available at http://www.pitman.co.za/projects/charva, 5 pages printed Feb. 17, 2005.
Oracle 9i Application Server: Oracle Forms Services, A Technical White Paper, Nov. 2000, 14 pages printed from http://www.oracle.com/technology/products/forms/pdf/forms_two.pdf.
Oracle 9i Application Server Release 1 Forms Services, feature overview, 5 pages printed from http://www.oracle.com/technology/products/forms/htdocs/forms_fov.htm, Sep. 3, 2004.

* cited by examiner

*Primary Examiner* — Phuoc Nguyen
*Assistant Examiner* — Mark D Fearer
(74) *Attorney, Agent, or Firm* — Park, Vaughan, Fleming & Dowler LLP; Shun Yao

(57) ABSTRACT

A system and method for serving an application to different types of client devices. The application is served from a J2EE-compliant application server, to clients operating a variety of communication protocols (e.g., HTTP, Telnet). The application is developed according to a single application model, but can be served to heterogeneous clients. The application communicates via a request/response format (e.g., HTTP), thereby requiring clients communicating via other formats or protocols (e.g., Telnet byte streams) to connect to the application via one or more other components of the application server. Illustratively, the application server includes a Telnet resource adapter for maintaining persistent communication connections with Telnet clients, and an EJB (Enterprise Java Bean) configured to discretize continuous Telnet data streams into discrete application requests.

13 Claims, 2 Drawing Sheets

SYSTEM AND METHOD FOR SERVING AN APPLICATION TO A HETEROGENEOUS COLLECTION OF CLIENT DEVICES

RELATED APPLICATION

This application claims priority to U.S. Provisional Application Ser. No. 60/609,052, which was filed Sep. 11, 2004 and is incorporated herein by reference.

BACKGROUND

This invention relates generally to the field of computer systems. More particularly, a system and method are provided for enabling an application server to serve an enterprise application over multiple protocols, such as telnet and HTTP.

Enterprise Information Systems (EIS) provide information infrastructures for an enterprise. Example EISs include an Enterprise Resource Planning (ERP) system such as the Oracle E-Business Suite, a mainframe transaction processing system, a relational database system, and so on.

The J2EE Connector Architecture (JCA) facilitates integration of application servers with heterogeneous Enterprise Information Systems. JCA defines System-level Contracts that encapsulate important requirements for effective and scalable integration with EISs, such as connection management and pooling, transaction management to support transactions internal to an EIS and across multiple EISs, error logging and tracing, and a security framework enabling both container-managed and component-managed sign-on.

The EIS side of a System-level Contract is implemented in a Resource Adapter, which is specific to an underlying EIS. A Resource Adapter is a system-level software driver used by an application server (e.g., a J2EE application server) or an application client to communicate and operate with an EIS. While a Resource Adapter is specific to the EIS it represents, it is not specific to a particular application server and can therefore be reused across J2EE application servers.

JCA offers System-level Contracts (e.g., Message Inflow, Transaction Inflow) that specifically support asynchronous message delivery between EISs and application servers, from a wide range of message providers. Thus, JCA applications can benefit from simplified bi-directional communications with EISs.

Applications in the context of application servers are typically developed for a specific client communication protocol. For example, a warehouse or retailer may employ an application server to serve a legacy application, using the telnet protocol, for inventory control, shipping and/or other purposes. Employees may operate telnet-based client devices, which are relatively cheap and easy to operate. The client devices employ a terminal emulation program that provides a simple character-based user interface to its user and communicates with the application server using the telnet protocol. The legacy application may have been in use for a long period of time, and may work reliably with the relatively old devices.

However, newer, more powerful devices offering richer graphical user interfaces such as HTML (Hypertext Markup Language) browsers are available, many of which are able to support embedded peripherals (e.g., digital camera, printer, RFID scanner) that older, telnet-based, devices cannot.

And, due to the availability of powerful HTML browsers for desktop use, application servers have been enhanced to serve HTML applications over HTTP (HyperText Transport Protocol)—such an application may be referred to as a web application. At the same time, standards bodies such as the W3C (World Wide Web Consortium) and JCP (Java Community Process) have pushed many standards to promote the adoption of new technologies to improve the quality of web applications.

An application developed to be served to one type of client device via one communication protocol generally cannot simultaneously be served to devices employing other protocols. Thus, the legacy warehouse or retailer application above could not be served by the same application server to an HTML client over HTTP, just as a web application cannot be served to a telnet client.

To operate multiple types of devices in one application environment would require substantial redundancy—multiple application models, applications, server management procedures, installation procedures, etc. Thus, one application server would be deployed to serve the application to the telnet devices, while a separate application server would serve the application to HTTP devices.

An organization may naturally desire to upgrade its older devices or evolve its legacy application to add capabilities, but will want to avoid the inefficiency inherent in such redundancy. The organization may therefore wish to perform the upgrade in a phased manner, so as to continue using older client devices as long as possible and not lose its investment in the older technology. But, to facilitate this phased approach, the application server must be able to serve an application in multiple formats (e.g., telnet and HTTP).

Telnet-based clients use persistent connections, and can send a continuous stream of data to the server. There is no concept of a "complete request" from a device's telnet emulator. In contrast, HTTP-based clients generally use non-persistent connections, sending discrete requests via HTTP and receiving discrete responses. The request serves as a complete collection of information that the application server can process. Thus, an application server configured to serve an application using a request/response-type format (e.g., via HTTP) could not serve incompatible clients (e.g., telnet clients).

Currently, there is no easy way for a single application server operating with an EIS to serve one application to multiple devices configured for different types of service (e.g., telnet, HTTP). The current approach is to use different application servers, which makes it difficult to have a single application development model and to re-use a single application on telnet-based and HTTP-based devices.

SUMMARY

In one embodiment of the invention, a system and methods are provided for serving an application to different types of client devices. The application is served from a J2EE-compliant application server, to clients operating a variety of communication protocols (e.g., HTTP, Telnet).

The application is developed according to a single application model, despite its ability to be served to heterogeneous clients. The application communicates via a request/response format (e.g., HTTP), and may communicate with HTTP clients via an HTTP listener. Clients communicating via other formats (e.g., Telnet) may connect to the application via other components of the application server.

In one embodiment, the application server includes a Telnet resource adapter for receiving and maintaining persistent communication connections with Telnet clients, and an MDB (Message Driven Bean) or EJB (Enterprise Java Bean) configured to discretize continuous Telnet data streams into discrete application requests. The resource adapter or the MDB may maintain state information for each Telnet client (e.g., to mirror the contents of the client display or Telnet emulator).

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, a system and method are provided for serving an application to a heterogeneous collection of client devices from a single application server process; in particular, the client devices are served in different formats or via different communication protocols. In another embodiment of the invention, a system and method are provided for discretizing client-server interactions received via persistent communication connections for issuance to the application via non-persistent communication connections.

Figure 1:
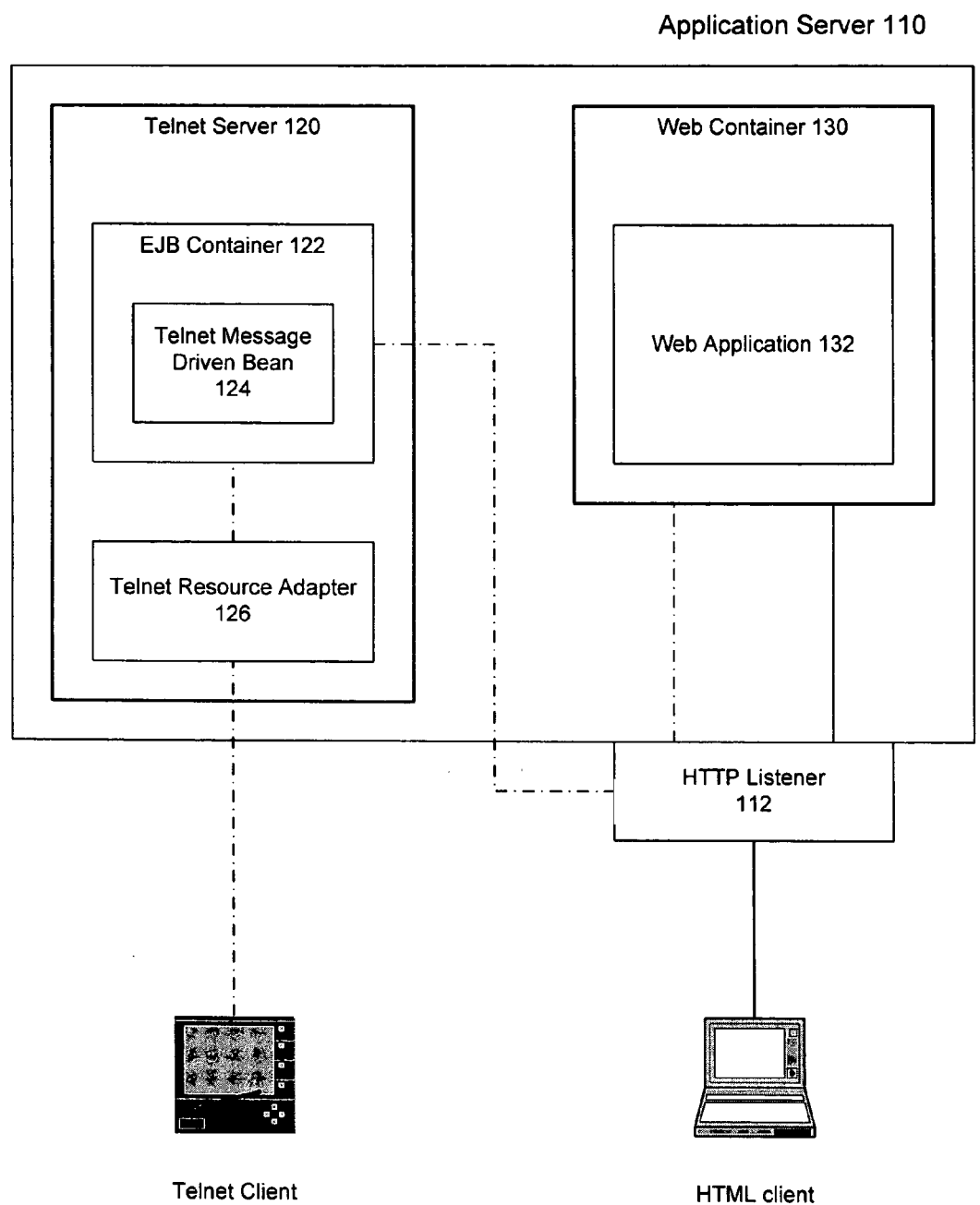
FIG. 1 depicts a computing environment in which an embodiment of the present invention may be implemented.

Embodiments of the invention described herein are suitable for implementation within a computing environment such as that depicted in FIG. 1. In FIG. 1, application server 110 serves web application 132 to a variety of clients using different communication protocols and/or formats.

For example, one subset of the clients may comprise telnet terminals or other devices configured to communicate with a server via the Telnet protocol. Another subset of the clients may comprise devices that include HTML (or other) browsers and that are configured to communicate via HTTP. Thus, in one embodiment of the invention, a single application (e.g., application 132) is served to a heterogeneous mix of client devices.

One skilled in the art will appreciate that telnet connections and HTTP connections are very different. In particular, a telnet connection is persistent, meaning that a telnet client device typically establishes a single connection with a server, and that connection is maintained as long as the client device operates with the server. In contrast, HTTP connections are generally non-persistent. An HTTP client device may open a separate HTTP connection for each request/response interaction with a server, with each connection only lasting until the interaction is complete.

Thus, in one embodiment of the invention, a client that normally communicates with a server using a persistent communication connection cannot communicate directly with a web application that expects to receive request/response-type interactions. An application server that serves the web application is therefore configured to translate between a continuous stream of data, as may be received from a Telnet client, and the application's request/response format.

In FIG. 1, application server 110 includes Telnet server 120 and web container 130. Web application 132 is deployed within the web container (e.g., as a .ear file); Telnet server 120 may also be deployed as a .ear file. In one implementation, application server 110 is a J2EE (Java 2 Enterprise Edition) server, such as Oracle Application Server by Oracle Corporation. Web application 132 comprises a single application process that supports a heterogeneous mix of client devices that employ different communication protocols.

The client devices may be coupled to application server 110 by wired and/or wireless communication links. The devices operate a client version of application 132, and may include portable and/or non-portable devices. Some clients may communicate with the application server via discrete requests and/or responses transmitted over non-persistent communication connections (e.g., using HTTP). Some may communicate via (theoretically) continuous streams of data transmitted over persistent connections (e.g., using Telnet).

HTTP listener 112, which may be deployed as part of application 132 in another embodiment of the invention, comprises a listener for HTTP connections, and may include a web server (e.g., by Apache). The HTTP listener is configured to receive connections from HTTP clients and relay client-server interactions between the clients and the web container within which web application 132 is deployed.

Telnet server 120 conforms to the JCA standard and comprises EJB (Enterprise Java Bean) container 122 and Telnet resource adapter 126. EJB container 122 includes an EJB such as Telnet MDB (Message Driven Bean) 124.

Telnet resource adapter 126 provides low-level Telnet support to Telnet clients, and comprises a Telnet listener for accepting and maintaining connections with those clients. Thus, the Telnet resource adapter creates server sockets for Telnet devices to connect to and performs Telnet option negotiation. Telnet resource adapter 126 also includes a WorkManager module for receiving and scheduling Work from clients and for creating and managing threads of execution.

As indicated in FIG. 1, Telnet server 120 interacts with clients (i.e., Telnet clients) and, via HTTP listener 112, with web application 132. Communication between the Telnet server and the web application may be in-process or out-of-process.

On the client side, in the illustrated embodiment of the invention Telnet server 120 accepts incoming connections from Telnet clients, receives input from the clients and streams output to the clients so as to provide a data entry form interface to the client user. The Telnet server handles the drawing and behavior of primitive controls (e.g., text input, select). Telnet server 120 also maintains the state of each Telnet client's screen or display device, including the current cursor position, and provides error handling capability.

On the application side, in this embodiment Telnet server 120 forms HTTP requests (or other request forms expected by web application 132) to provide field-level information (e.g., as opposed to page-level information provided by an HTML browser) to the web application via HTTP listener 112 and the web container. The Telnet server receives HTTP responses (or other types of responses) from the application, and uses the content to update the state of the Telnet clients.

In one embodiment of the invention, payloads of application responses (e.g., HTTP responses) returned from web application 132 to Telnet server 120 for Telnet clients comprise a lightweight markup language that accommodates the user interface restrictions of the Telnet clients. This markup language may be called TML (Telnet Markup Language), and may comprise a subset of HTML. A TML payload may represent a full Telnet client screen or an update to a client screen.

Telnet MDB 124 operates between Telnet resource adapter 126 and web application 132, and may be considered a Telnet management module. The Telnet MDB receives input from a telnet connection established between Telnet resource adapter 126 and a Telnet client, and determines whether the input constitutes an event requiring some action. If so, the Telnet MDB also determines whether the event should be passed to application 132. If so, the Telnet MDB translates the client message or input into a format (e.g., a request/response format) understood by application 132 and converts responses from the application into a format (e.g., byte stream) that can be sent to the client. Because it generates output for clients, the Telnet MDB is responsible for drawing the clients' user interfaces.

In one embodiment of the invention, Telnet resource adapter 126 receives client input in the form of byte streams, packages the input into message objects and forwards them to Telnet MDB 124 for processing. In another embodiment of the invention, the Telnet resource adapter passes raw input to the Telnet MDB.

Telnet MDB 124 or EJB container 122 may include a Telnet requester (e.g., an HTTP client) for sending requests to, and receiving responses from, the web application.

Telnet resource adapter 126 is started by the Telnet server, and in turn starts a ServerSocket for accepting Telnet client connections. For each client connection, the Telnet resource adapter may create two JCA Work implementations—one to handle client negotiation and another to process input bytes from the client. The resource adapter may employ the Java NIO (New Input/Output) system.

A Telnet resource adapter Work unit tasked with handling a client negotiation will obtain and register a client socket, obtain a client device configuration (e.g., based on the client's IP address), perform options negotiation with the client, create a unique session object for the connection, invoke a method of the Telnet MDB to load a first page of the application, forward output bytes to the client from the Telnet MDB, and/or perform other tasks.

A Telnet resource adapter Work unit tasked with processing client input will obtain the session object associated with the client's session, read the input bytes, invoke Telnet MDB logic to process the input bytes, return any output bytes to the client, and/or perform other tasks.

When the Telnet resource adapter invokes the Telnet MDB, it calls the appropriate method (any number of methods may be exposed by the MDB) with the corresponding session object and a flag or identifier for identifying the type of processing needed (e.g., client connection, client disconnection, client input). Because the Telnet resource adapter and Telnet MDB may be operating in different processes (and there may be multiple Telnet MDBs in operation), the session object must be serializable and the MDB must return the session object with its response.

When invoked for a new client connection, the Telnet MDB initializes any MDB-specific state in the client session object, loads the first application page, draws the result to the client, and returns the updated session object to the Telnet resource adapter. When invoked for a client disconnection, the Telnet MDB informs the application of the disconnection.

When invoked to process client input, in one embodiment the Telnet MDB decodes the input bytes into input characters (e.g., text, control, special) and examines them. Depending on the client's current page state, the MDB determines how many characters to process. For example, if the client cursor is on an input field and enters a sequence of five characters, all five may be processed together. The MDB then determines whether the input must be passed to the application server for processing. The client state maintained by the Telnet server is updated either way and any updated drawing of the client screen is issued. The Telnet MDB returns the session object to the Telnet resource adapter when processing of the client input is complete.

In one embodiment of the invention, the specific actions or events that the Telnet MDB may report to the application, based on a client's input, include: Activate (a button was pressed), Jump (move to a specific field), Next (move to next field), Previous (move to previous field), Virtual_Key (a special key combination was pressed), Barcode_Scan (a barcode was scanned), etc. For each action, an HTTP request is constructed to identify the action and client session object. The MDB then creates a connection to the application, sends the request and receives a response.

In the embodiment of the invention illustrated in FIG. 1, web application 132 communicates with HTTP listener 112 via HTTP or some other suitable request/response format. HTTP listener 112 can relay these communications directly to HTTP clients, while Telnet (and/or other) clients receive the communications in their own formats, as translated by Telnet MDB 124.

Thus, instead of requiring multiple software infrastructures (e.g., different application models, different applications, different application server management procedures) to support heterogeneous clients, web application 132 is developed according to a single (e.g., J2EE) development model.

In one embodiment of the invention, application 132 may generate responses differently, depending on the client that a response is destined for. For example, a response for an HTTP client may be generated using HTML, while a response for a Telnet client may be generated using TML (Telnet Markup Language).

In one alternative embodiment of the invention, application server 110 is not a J2EE application server. In this embodiment, web application 132 is still served to HTTP clients through HTTP listener 112. Telnet server 120, however, may be replaced by a Telnet listener and a presentation manager configured to act as an interface between the Telnet communication format and the format (e.g., HTTP) expected by the application.

In the embodiment of FIG. 1, Telnet MDB 124 buffers incoming data (i.e., data from a Telnet client) until the buffered data comprises an event, application request or other discrete communication that must be acted upon. Depending on the type of application and the current state of the application, Telnet MDB 124 may discretize or separate incoming data into any request accepted by the application. For a warehouse application operating with a mix of Telnet and HTTP clients, such requests may relate to Navigation, Data Entry, Barcode Scan, Special Key combinations, etc.

The resulting HTTP request that the MDB issues to the application can be treated and responded to by the application in the same way as a standard HTTP request (e.g., from an HTTP client).

When a response or other communication is received from application 132, Telnet MDB 124 segments or subdivides the communication into a suitable format (e.g., a byte stream) for transmission to the Telnet client by the Telnet resource adapter.

In this embodiment of the invention, Telnet MDB 124 (or Telnet resource adapter 126) maintains state information for each Telnet client accessing web application 132 via Telnet server 120. This may facilitate the MDB's function of determining when sufficient data has been received from a client to constitute a discrete application request.

In one embodiment, a client's state information is updated to reflect data received from the client, as well as responses received from the application. The state information maintained by the Telnet MDB for a Telnet client may include a virtual copy of the client's display, the location of a cursor on the display, etc.

Application server 110 of FIG. 1 may employ JSF (Java Server Faces) to facilitate the serving of application 132 to different types of clients. However, Telnet server 120 is still required in order to translate communications between Telnet and HTTP formats.

In the embodiment of the invention depicted in FIG. 1, Telnet clients display text in a small number of rows and columns. A Telnet client's display is drawn by Telnet server 120, which transmit texts and simple commands to the device. For example, the Telnet server can instruct a client to move its cursor to column X and row Y, and then print the string S.

Telnet client input capabilities may be limited to character-based input. In character mode, when a user enters a character (typically via a keypad) the character is sent to the Telnet server. The server then does some processing on the input. In some cases textual characters are simply echoed back to the client screen. In other cases (e.g., when a selection is made), the server uses the input for processing and may or may not echo the response to the screen.

Depending on the capabilities and settings of a Telnet client, characters may not be sent from the client to the server individually. In line mode, for example, textual characters are buffered on the client and echoed to the screen until the user enters a non-textual character (e.g., ctrl-A) or a specified key (e.g., Tab or Enter). At this point, all of the buffered characters are sent to the Telnet server as a group (including the input that caused the characters to be sent).

The size of a Telnet client's display in terms of rows and columns is important for determining the low-level display of controls and other components of the application. This information is available to the Telnet server through a device repository, which exposes all device capabilities associated with the client device.

On Telnet clients that do not support color, it is possible to draw characters in two modes-regular and highlighted. On a typical display, the regular text may appear as white text on a black background and highlighted text may appear as black text on a white background. Embodiments of the invention described herein may or may not support Telnet clients with color displays.

The behavior of Telnet server 120 regarding a particular Telnet client will depend on the client's page context, which may encompass the page state, field type (of the current field) and any special key combinations. Depending on the application, other information may be included in the page context. For example, in a warehouse application, a page context may include a barcode character scanned or input by the client.

Telnet server 120 (e.g., Telnet MDB 124) may enforce application security on Telnet clients. For example, when a Telnet client attempts to access a protected page of the web application, the Telnet server may authenticate the user via a login or other page displayed in response to an HTTP response code from the application. The application is thus able to apply security to all types of clients in the same way (e.g., via HTTP response codes).

Illustratively, a client's page state may be "normal," "system page," "status message" or "pop-up message." Normal page state refers to a normal interactive state. System page is a state in which the active page is fully controlled by the Telnet server (e.g., an error detail page, a message detail page, a help page). In a status message state, a message appears in a status bar of the client page (e.g., to report an application message or an error). In a pop-up message state, a message is displayed in its own window on the page; the message is usually issued by the application.

Fields of a page may be of types such as "form fields" and "text fields." Because most applications using Telnet clients may be designed to collect data from users, most field types may be "form" field types, which include input fields, output fields, button fields (e.g., buttons for triggering some action), select fields (e.g., for selecting one or more values), secret fields (i.e., for entering input that is masked on the display screen), etc. Data may be presented to a user using "text" field types.

Special keys are key combinations that produce special characters or combinations of characters. In response to a special key input, the Telnet server may initiate a system function (e.g., defined by a system administrator) or a user-defined function (e.g., defined by the application).

A barcode character may help the Telnet server determine the significance of input from a client. For example, depending on the nature of the current field of a page, a barcode may have to be reported to the application for further processing.

Thus, not all interaction between a Telnet client and the Telnet server requires the application (e.g., web application 132 of FIG. 1) to be invoked. Many client events may be handled by the Telnet server with no application involvement. For example, a client connection to the Telnet server and the resulting options negotiation need not involve the application.

Client events that require communication with the application may be considered "significant" or "application" events, and include events such as a request for a first page, disconnection of a client, and some types of client input. Whether client input is "significant" depends on the context of the application and the client page.

For example, input during a normal client page state may not be significant enough to involve the application if the input does not involve a special key or character. However, if the input comprises a move to a next field (e.g., using the Enter key or an arrow key), the event may be reported to the application.

When the Telnet server (e.g., Telnet MDB 124 of FIG. 1) issues an HTTP request to the application, the request may be a GET request with name value pairs corresponding to the following information:

Action Type: Identifies a significant Telnet client event that occurred. Action types and the characters that cause them may be specific to individual field types. Example action types include Next_Field, Activate, Special_Key, etc.

Action Value: Identifies a value associated with an action; may only be used when the action type is "Special_Key."

Current Field ID: Identifies the current field.

Current Field Value: Value of the field corresponding to the current field ID.

Illustratively, each HTTP request corresponds to a single significant event, which corresponds to an event that occurred on a single field. In one embodiment, each HTTP request issued to the application for a Telnet client contains all salient information from preceding events for that client, back to the preceding significant event, in order (i.e., from oldest to newest). This ensures that the application possesses all necessary state information regarding the client.

An HTTP response from the application to the Telnet server may comprise TML, as described above. The response may include a full TML document containing information about the different fields on a page, including their layout. Or, the response may include a TML document fragment containing information on how to modify a portion of the client user interface.

In alternative embodiments of the invention, a Telnet server such as Telnet server 120 of FIG. 1 may offer other functions not described above. For example, a Telnet server may provide session mirroring, to mirror a client session across multiple IP (Internet Protocol) or other network addresses, for multiple Telnet clients. Illustratively, one of the multiple clients would be the "controlling" client; the others would be "dumb." An application server may be enhanced with additional logic allowing other clients' sessions (e.g., HTTP clients') to also be mirrored.

In another alternative embodiment, an application server or Telnet server may allow a system administrator or other operator to broadcast a message to some or all clients.

Figure 2:
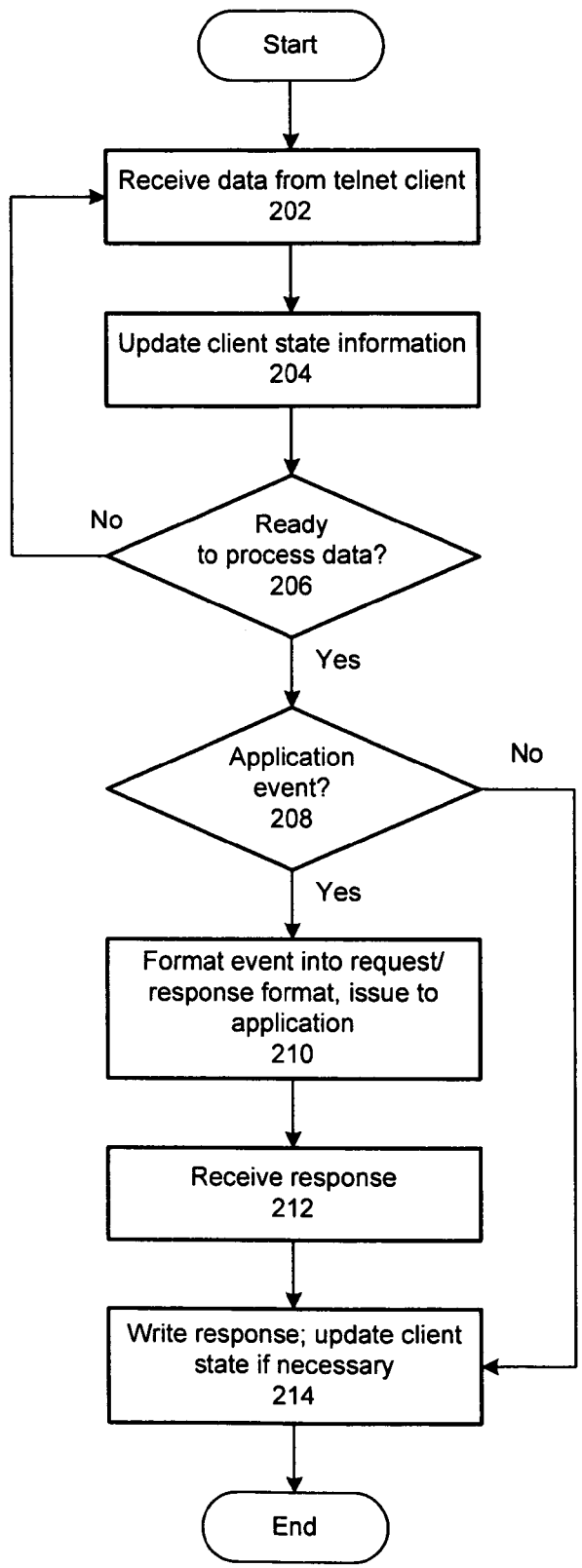
FIG. 2 depicts a method of discretizing client-server interactions received via persistent communication connections, in accordance with an embodiment of the invention.

FIG. 2 is a flowchart demonstrating a method of discretizing client-server interactions, according to one embodiment of the invention. In this embodiment, a J2EE-compliant application server serves a web application to a heterogeneous mix of client devices operating a client form of the application. In this embodiment, the application is configured to communicate in a request/response format.

Some of the clients are Telnet clients (i.e., clients that communicate with the application server using Telnet) and some of which are HTTP clients. The web application was developed according to a single application development model, but can be served to heterogeneous devices.

Prior to operation 202, a Telnet client establishes a persistent communication connection with the application server (e.g., Telnet resource adapter 120 of FIG. 1). If only one application is registered with the application server, a URL (Uniform Resource Locator) of the application may be automatically invoked. If there are multiple applications available, a list of the applications may be presented to the client for a user to choose from. In one embodiment, Telnet clients must be authenticated before an application may be invoked on its behalf.

In operation 202, the application server receives data from a Telnet client over the previously established persistent communication connection. This connection may persist for the duration of the client's use of the application (e.g., until the device is turned off or until the application client is terminated). The data may be received as a stream of bytes as specified by the Telnet protocol.

Illustratively, the data may be received by a resource adapter configured to accept Telnet connections and receive data over those connections. Within the resource adapter, a WorkManager module may be configured to receive the data and forward it as needed.

In operation 204, the application server updates a stored state of the client to reflect the incoming data. For example, the data may identify a position of a cursor on a display component of the client, and/or character data entered or selected at that position. The stored state may mirror the state of the client's display and/or other data used in the execution of the client form of the application, and may be maintained by a resource adapter, an EJB or other component of the application server.

In operation 206, the application server (e.g., a Telnet server) determines whether it has accumulated sufficient data from the client to constitute an event requiring some action. For example, if input for a particular field is being received, the application server may determine whether the input is complete. If sufficient data has been received, the method advances to operation 208; otherwise, the method returns to operation 202 to receive additional data.

In operation 208, the application server determines whether the event is an application event—an event that must be passed to the web application. In particular, the application server (e.g., a resource adapter, a specialized EJB such as a Telnet MDB) analyzes the accumulated data and determines whether that data defines or describes an event for which an application request may or should be issued. Because the client's communication connection is persistent, the application server may have previously received any number (0 or more) of events from the same client over the same connection.

If the event corresponds to an application event, the illustrated method continues with operation 210; otherwise, the event can be handled without involving the application, and so the method advances to operation 214.

In operation 210, the application server (e.g., a specialized EJB such as a Telnet MDB) formats a request and issues it to the web application. If the application is configured for HTTP communications, the request may adhere to the HTTP request/response format and may transit an HTTP listener that accepts requests for the application. The application server, or the component of the application server that performs this operation, may include an HTTP client (or other protocol client) for communicating with the application on behalf of the Telnet client.

In operation 212, the application returns a response to the request, which may comprise HTML, TML or some other markup language.

In operation 214, the application server places a response to the event into a suitable format (e.g., byte stream) and forwards it to the client. This may involve converting the response from the web application's format if the event was an application event. Or, if the event was not an application event and was therefore handled by a Telnet server or a specialized EJB, the response may be generated in the appropriate format for the client. The application server also updates its client state information as needed. After operation 214, the illustrated method of the invention ends.

In one embodiment of the invention, TML (Telnet Markup Language) provides a markup language representation of a Telnet client screen. TML from the application may be transformed into field types described above. As described, an application may issue a full TML document, representing what is to be displayed on a Telnet client screen, or may issue a change to be applied to a client screen.

The root element of a TML document is the tml tag. A full TML document may have a head element and a body element as children of the tml tag. The body element may have elements such as div (to contain other elements and/or text), input (for text input), output (for text output), button (for activating application logic), select (to allow selection from a list), label (to contain a textual description of an element), option (to contain an option for a select element), etc.

For a partial or fragment TML document, the tml tag may have a head element and a trackedChanges element as children. A trackedChanges element may have any number of trackedChanges elements as children, with each child tracking a particular change in a page state. Each trackedChanges element has attributes identifying what is to change.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. An application server for serving a single application to clients configured to communicate with the application server using different communication protocols, the application server comprising:
   an application operating a non-persistent communication protocol on a physical network, wherein the application server is configured to facilitate communication between the application with both a first client operating a persistent communication protocol and a second client operating a non-persistent communication protocol;
   a first listener configured to:
     establish a persistent connection with the first client;
     determining that an input from the first client needs to be forwarded to the application;
     translate the input comprising a continuous stream of data associated with the persistent connection into a format comprising a discrete request or response; and
     forward the translated request or response to the application on behalf of the first client; and
   a second listener configured to:
     establish a non-persistent connection with the second client; and
     relay a discrete request or response from the second client and a translated request or response from the first listener to the application.

2. The application server of claim 1, wherein:
   the application server is a J2EE (Java 2 Enterprise Edition) compatible application server.

3. The application server of claim 2, wherein:
   the non-persistent connection is a Hypertext Transport Protocol (HTTP) connection; and
   the persistent connection is a Telnet connection.

4. The application server of claim 2, wherein:
   the first listener is a Telnet listener; and
   the second listener is an HTTP listener.

5. The application server of claim 2, wherein:
   the first listener comprises a management module, which is an Enterprise Java Bean (EJB).

6. The application server of claim 5, wherein:
   the management module is configured to facilitate communication between the first listener and the application using the HTTP request or response format.

7. A computer-implemented method of serving a single application to client devices configured to communicate with the application server using different communication protocols, the method comprising:
   executing, at a computer, an application operating a non-persistent communication protocol, wherein the application server is configured to facilitate communication between the application with both a first client operating a persistent communication protocol and a second client operating a non-persistent communication protocol;
   developing the application as a web application which communicates with the first and second clients via a non-persistent format;
   deploying the application in the application server within a web container;
   executing a first listener at the computer to:
     establish a persistent connection with the first client;
     determine that an input from the first client needs to be forwarded to the application;
     translate the input comprising a continuous stream of data associated with the persistent connection into a format comprising a discrete request or response; and
     forward the translated request or response to the application on behalf of the first client; and
   executing a second listener at the computer to:
     establish a non-persistent connection with the second client; and
     relay a discrete request or response from the second client and a translated request or response from the first listener to the application.

8. The method of claim 7, further comprising operating a management module between the first listener and the application, wherein said operating comprises:
   receiving a first byte stream from the first client;
   recognizing the first byte stream as corresponding to a first request;
   issuing the first request to the application;
   receiving a first response from the application; and
   forwarding a second byte stream corresponding to the first response toward the first client.

9. The method of claim 7, wherein:
   the first listener is a Telnet listener;
   the first client is a Telnet client device;
   the second listener is an Hypertext Transport Protocol (HTTP) listener; and
   the second client is an HTTP client device.

10. The method of claim 7, wherein the persistent connection with the first client is a Telnet connection.

11. The method of claim 7, wherein the non-persistent connection with the second client is an Hypertext Transport Protocol (HTTP) connection.

12. The method of claim 7, wherein:
   the single application server is compliant with J2EE (Java 2 Enterprise Edition); and
   the web application is developed according to a Java 2 software development kit.

13. A non-transitory computer readable medium storing instructions that, when executed by a computer, cause the computer to perform a method of serving a single application to client devices configured to communicate with the application server using different communication protocols, the method comprising:
   executing an application operating a non-persistent communication protocol, wherein the application server is configured to facilitate communication between both a first client operating a persistent communication protocol and a second client operating a non-persistent communication protocol;
   developing the application as a web application, which communicates with the first and second clients via a non-persistent format;

deploying the application in the application server within a web container;

executing a first listener to
- establish a persistent connection with the first client;
- determine that an input from the first client needs to be forwarded to the application;
- translate the input comprising a continuous stream of data associated with the persistent connection into a format comprising a discrete request or response; and
- forward the translated request or response to the application on behalf of the first client; and executing a second listener to:
- establish a non-persistent connection with the second client; and
- relay a discrete request or response from the second client and a translated request or response from the first listener to the application.

* * * * *

UNITED STATES PATENT AND TRADEMARK OFFICE
CERTIFICATE OF CORRECTION

PATENT NO. : 7,949,760 B2  Page 1 of 1
APPLICATION NO. : 11/057429
DATED : May 24, 2011
INVENTOR(S) : Chitilian et al.

It is certified that error appears in the above-identified patent and that said Letters Patent is hereby corrected as shown below:

In column 12, line 51-52, in Claim 12, delete "2software" and insert -- 2 software --, therefor.

Signed and Sealed this
First Day of November, 2011

David J. Kappos
*Director of the United States Patent and Trademark Office*